US012792522B2

(12) United States Patent
Wai et al.

(10) Patent No.: US 12,792,522 B2
(45) Date of Patent: Nov. 10, 2026

(54) METHOD AND SYSTEM FOR MEMORY ACCESS BY VIRTUAL MACHINE WITHOUT ADDRESS TRANSLATION

(71) Applicant: Avago Technologies International Sales Pte. Limited, Singapore (SG)

(72) Inventors: Eddie Ki-Man Wai, Rowland Heights, CA (US); Jongpil Lee, New York, NY (US); Hemal Vinodchandra Shah, Trabuco Canyon, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 37 days.

(21) Appl. No.: 18/960,052

(22) Filed: Nov. 26, 2024

(65) Prior Publication Data

US 2026/0147713 A1 May 28, 2026

(51) Int. Cl.

*G06F 12/1009* (2016.01)
*G06F 12/1027* (2016.01)
*G06F 12/1036* (2016.01)

(52) U.S. Cl.

CPC ...... *G06F 12/1009* (2013.01); *G06F 12/1027* (2013.01); *G06F 12/1036* (2013.01)

(58) Field of Classification Search

CPC .. G06F 12/10; G06F 12/1009; G06F 12/1027; G06F 12/1036

See application file for complete search history.

(56) References Cited

U.S. PATENT DOCUMENTS

| | | | | |
|---|---|---|---|---|
| 10,013,388 B1 * | 7/2018 | Wang | G06F 13/4282 |
| 2016/0203030 A1 * | 7/2016 | Tateishi | G06F 9/45558 718/105 |
| 2018/0157596 A1 | 6/2018 | Amit | |
| 2018/0365160 A1 * | 12/2018 | Jiang | G06F 9/45558 |
| 2019/0213138 A1 * | 7/2019 | Panesar | G06F 12/1009 |
| 2019/0391851 A1 * | 12/2019 | Franciosi | G06F 9/5077 |

(Continued)

OTHER PUBLICATIONS

Tian, Kun, Yu Zhang, Luwei Kang, Yan Zhao, and Yaozu Dong. "coIOMMU: A virtual IOMMU with cooperative DMA buffer tracking for efficient memory management in direct I/O." In 2020 USENIX Annual Technical Conference (USENIX ATC 20), pp. 479-492. 2020.*

(Continued)

*Primary Examiner* — Tracy A Warren
(74) *Attorney, Agent, or Firm* — Quarles & Brady LLP

(57) ABSTRACT

Method and system for direct memory access. According to an embodiment, the subject technology provides a system for facilitating memory address translation in a virtualized computing environment to enable efficient access to a graphics processing unit (GPU) by a virtual machine. The system includes a host machine equipped with a host tool configured to obtain and map address translations between a first memory address associated with the virtual machine and a second memory address associated with GPU memory. The host tool provides a mapping table containing these address mappings. A communication link is configured to transfer the mapping table from the host machine to the virtual machine. Within the virtual machine, a driver for a network communication device receives the mapping table and provides the second memory address to another address mapping table on the network communication device.

19 Claims, 4 Drawing Sheets

(56) References Cited

U.S. PATENT DOCUMENTS

| | | | | |
|---|---|---|---|---|
| 2021/0149821 | A1 | 5/2021 | Cui et al. | |
| 2022/0129399 | A1* | 4/2022 | Tian | G06F 9/45558 |
| 2022/0261178 | A1* | 8/2022 | He | G06F 12/1027 |
| 2023/0082195 | A1* | 3/2023 | Hammer | G06F 12/1009 711/154 |
| 2023/0385094 | A1* | 11/2023 | Markuze | G06F 13/404 |
| 2023/0401160 | A1 | 12/2023 | Huggahalli et al. | |

OTHER PUBLICATIONS

Lv, Chen, Fuxin Zhang, Xiang Gao, and Chen Zhu. "LA-vIOMMU: An Efficient Hardware-Software Co-design of IOMMU Virtualization." In 2022 IEEE Intl Conf on Parallel & Distributed Processing with Applications, Big Data & Cloud Computing, Sustainable Computing & Communications, Social Computing & Networking (ISPA/BDClo.*

Extended European Search Report dated Apr. 20, 2026 for Patent Application No. 25217945.2, 10 pages.

* cited by examiner

100

METHOD AND SYSTEM FOR MEMORY ACCESS BY VIRTUAL MACHINE WITHOUT ADDRESS TRANSLATION

FIELD OF INVENTION

The subject technology is directed to computer systems and methods.

BACKGROUND OF THE INVENTION

In today's computing environments, particularly in high-performance and data-intensive applications, graphics processing units (GPUs) play a critical role in accelerating workloads such as artificial intelligence (AI), machine learning (ML), and complex data processing. In the past, these GPU-intensive tasks are performed directly on dedicated hardware setups, either on bare-metal servers or within containers, to maximize performance.

Unfortunately, existing approaches are inadequate for the reasons provided below.

DETAILED DESCRIPTION OF THE INVENTION

Figure 1:
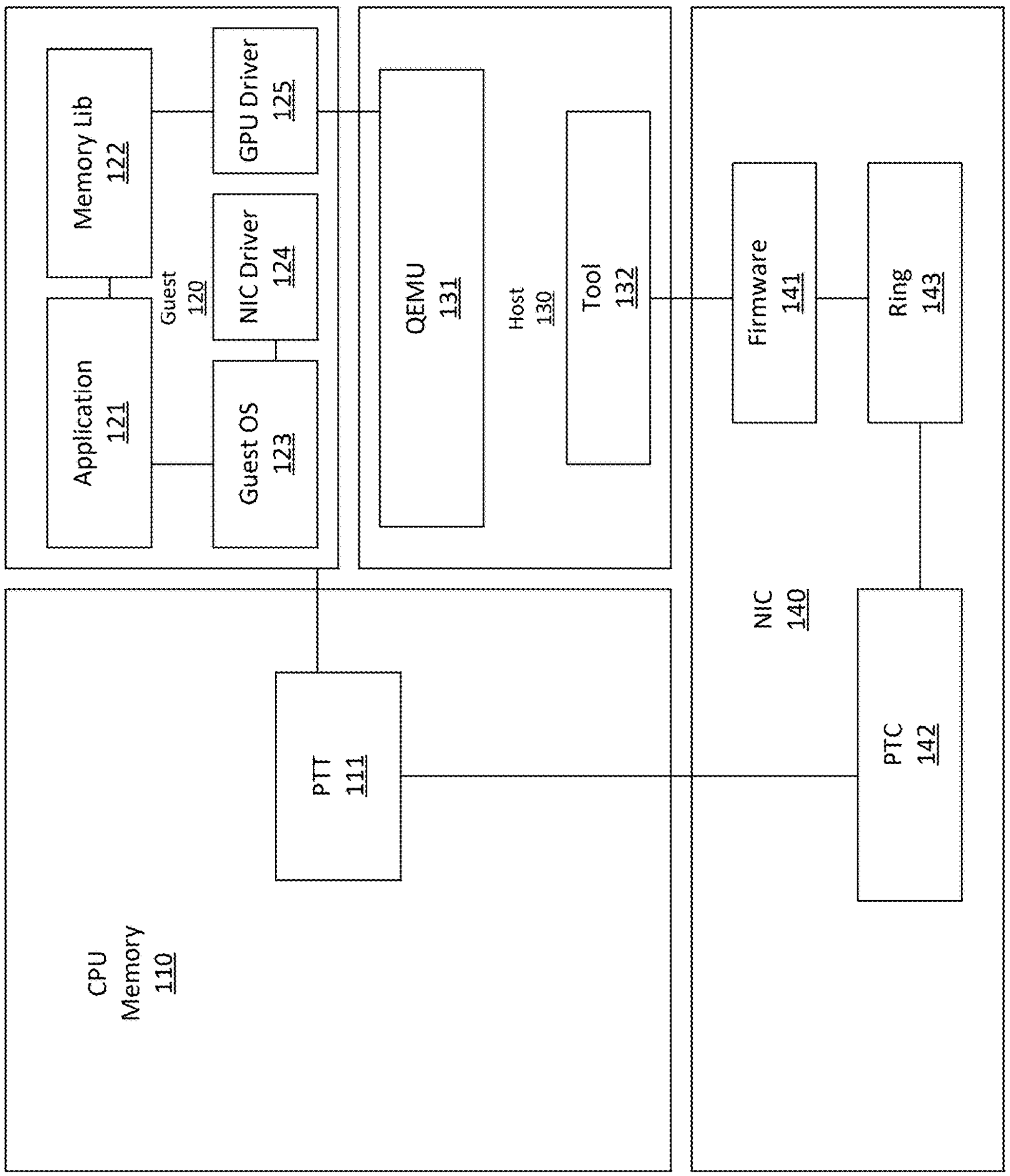
FIG. 1 is a simplified diagram illustrating a system for accessing GPU memory according to embodiments of the subject technology.

The subject technology is directed to computer systems and methods. According to an embodiment, the subject technology provides a system for facilitating memory address translation in a virtualized computing environment to enable efficient access to a graphics processing unit (GPU) by a virtual machine. The system includes a host machine equipped with a host tool configured to obtain and map address translations between a first memory address associated with the virtual machine and a second memory address associated with GPU memory. For example, direct translation from guest virtual address of the virtual machine to host physical address of the GPU may be performed. The host tool provides a mapping table containing these address mappings. A communication link is configured to transfer the mapping table from the host machine to the virtual machine. Within the virtual machine, a driver for a network communication device receives the mapping table and provides the second memory address to an address mapping table, enabling translation from the first memory address to the second memory address.

As mentioned above, improved systems and methods for GPU memory access are desired. More specifically, there is a growing need to enable efficient GPU access within virtualized environments, where multiple virtual machines (VMs) may require direct access to GPU resources to support parallelized and isolated workloads.

Among other things, virtualized access to GPU resources presents challenges due to the complexity of memory address translations required to map virtual machine memory spaces to physical GPU memory. In various existing approaches, address translations between a virtual machine's memory and GPU memory rely on intermediary processes, such as the central processing unit (CPU) of the host machine and system memory, to manage mappings and perform translations. Unfortunately, these approaches can introduce latency and processing overhead, reducing the efficiency of data transfer between the VM and the GPU.

In various implementations, one of the solutions to facilitate memory address translations between VM memory and GPU memory is the PCIe address translation service (ATS), which allows devices to request address translations from the input-output memory management unit (IOMMU) on the host machine. For example, the method involves periodic synchronization with the IOMMU. Unfortunately, sometimes the ATS may cause performance degradation, as the translation process is contingent on the cache size of the IOMMU and the frequency of address mapping updates, leading to inefficiencies in memory access and data placement.

In various embodiments, the subject technology provides a system that allows a network communication device, such as a network interface card (NIC), to directly translate guest virtual addresses (GVAs) of a VM to host physical addresses (HPAs) associated with GPU memory without the need for PCIe ATS. For example, it leverages a host tool to create a mapping table that associates GVAs with HPAs, enabling the NIC to access GPU memory directly through peer-to-peer (P2P) communication with reduced latency and bypassing the host CPU and system memory. By integrating address translation capabilities into the NIC, the synchronization overhead of PCIe ATS can be eliminated, and it improves data transfer speeds by enabling direct memory access (DMA) between the NIC and GPU.

It is to be appreciated that embodiments of the subject technology can be beneficial for AI and ML workloads in virtualized environments, as it enables the GPU to be shared efficiently among VMs without additional hardware support for address translations.

The following description is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of embodiments. Thus, the subject technology is not intended to be limited to the embodiments presented but is to be accorded the widest scope consistent with the principles and novel features disclosed herein.

In the following detailed description, numerous specific details are set forth in order to provide a more thorough understanding of the subject technology. However, it will be apparent to one skilled in the art that the subject technology may be practiced without necessarily being limited to these specific details. In other instances, well-known structures and devices are shown in block diagram form, rather than in detail, in order to avoid obscuring the subject technology.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

Moreover, the terms left, right, front, back, top, bottom, forward, reverse, clockwise and counterclockwise are used for purposes of explanation only and are not limited to any fixed direction or orientation. Rather, they are used merely to indicate relative locations and/or directions between various parts of an object and/or components.

Furthermore, the methods and processes described herein may be described in a particular order for ease of description. However, it should be understood that, unless the context dictates otherwise, intervening processes may take place before and/or after any portion of the described process, and further various procedures may be reordered, added, and/or omitted in accordance with various embodiments.

Unless otherwise indicated, all numbers used herein to express quantities, dimensions, and so forth should be understood as being modified in all instances by the term "about." In this application, the use of the singular includes the plural unless specifically stated otherwise, and use of the terms "and" and "or" means "and/or" unless otherwise indicated. Moreover, the use of the terms "including" and "having," as well as other forms, such as "includes," "included," "has," "have," and "had," should be considered non-exclusive. Also, terms such as "element" or "component" encompass both elements and components comprising one unit and elements and components that comprise more than one unit, unless specifically stated otherwise.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

FIG. 1 is a simplified diagram illustrating a system for accessing GPU memory according to embodiments of the subject technology. This diagram is merely an example, which should not unduly limit the scope of the claims. One of ordinary skill in the art would recognize many variations, alternatives, and modifications. As shown in FIG. 1, system 100 provides a virtualized computing environment that allows for efficient data transfers between a virtual machine and a GPU through a network communication device. For example, the network communication device comprises a network interface card (NIC). For example, a GPU may be a hardware component optimized for parallel processing and complex calculations, commonly used for AI, ML, and high-performance computing. For example, an NIC may be a device that connects a computer to a network and in some implementations, allows for direct access to the GPU memory.

Host machine 130 provides a physical environment, on which the virtualized components or virtual machines operate. For example, host machine 130 includes the memory management unit (MMU), which controls how memory is accessed and manages translations between different address spaces. For operating a virtual machine, host machine 130 includes a quick emulator memory management unit (QEMU 131) to facilitate memory access by the virtual machine. For example, QEMU 131 manages the translation of virtual addresses (used by applications within the VM) to physical addresses on the host system. Block 110 includes CPU and memory (e.g., DRAM) as components of host machine 130. For example, page translation table (PTT) 111 stores mappings between guest virtual addresses (GVAs) and host physical addresses (HPAs) associated with GPU memory. For example, PTT 111 includes a table that stores address mappings between the memory of the VM and the GPU. The PTT may be used to translate guest virtual addresses (GVA) from the VM to host physical addresses (HPA) associated with GPU memory. For example, GVA refers to an address used within a VM that must be translated to access physical memory on the host. For example, GPA refers to an intermediate address format representing the VM's memory location, which needs to be mapped to a host address for GPU access. As an example, HPA refers to the physical address on the host system or GPU. By maintaining these mappings, the PTT enables the NIC to translate addresses requested by the VM into physical addresses on the GPU, allowing direct memory access without involving the host CPU. For example, direct translation from guest virtual address of the virtual machine to host physical address of the GPU may be performed in the NIC, allowing for RDMA access to the GPU memory.

Host machine 130 includes host tool 132 which provides address translation management. This software utility is responsible for collecting address mappings from the system. For example, host tool 132 uses PCI and QEMU utilities to extract both GVAs and HPAs associated with GPU memory. The host tool then compiles these mappings into a mapping table that allows the NIC to understand the relationships between VM memory spaces and GPU memory locations. Once the mapping table is generated, the host tool facilitates its transfer to the virtual machine, ensuring that the VM has the information to access GPU resources directly. As an example, memory address translation or mapping refers to a process of converting one type of memory address into another type of memory address. In various embodiments, host tool 132 of host machine 130 uses PCI and/or QEMU utilities to extract GVA and HPA mappings and create the GVA-to-HPA mapping table.

Virtual machine (VM) 120, or referred to as a guest machine, operates as an instance on host machine 130. For example, VM 120 includes various software components that interact with the host and GPU. Inside the VM, application 121 may request GPU memory allocations for computational tasks that require processing power and memory. For example, these requests are managed by memory library 122, which handles memory allocations within the VM, including those that require access to the GPU. For example, the memory allocations are represented initially as GVAs within the VM. Guest operating system (OS) 123, for example, coordinates the operation of the VM, including the handling of device drivers.

VM 120 includes an NIC driver 124 that facilitates communication between the VM and the NIC, allowing the VM to retrieve and apply the mapping table generated by the host tool. For example, upon receiving the mapping table through a communication link, the NIC driver interprets the mappings and configures the NIC to understand the relationships between guest and host addresses. The NIC driver ensures that the NIC can access GPU memory directly. For example, NIC driver 124 may apply the received HPA information to its page table mechanism, replacing GVAs with corresponding HPAs to ensure accurate address translation for GPU access. GPU Driver 125, in various implementations, manages GPU-specific tasks within the VM, such as memory allocations and data transfers, and coordinates with the NIC driver to route memory access requests to the GPU efficiently. For example, the GPU contains a GPU memory, which may be allocated to different VMs based on their workload requirements. The GPU memory can be accessed through mappings that link VM memory addresses to corresponding GPU addresses, allowing the NIC to perform data transfers directly.

For example, NIC driver 124, incorporates a software module specifically designed to work with the address mappings. The software module retrieves the GVA-to-HPA mapping table from the conduit and configures the NIC to interpret and use these mappings. Additionally, GPU driver 125 manages tasks specific to GPU memory allocations and operations, coordinating with the NIC driver to facilitate direct access to GPU memory. The NIC driver applies the received HPA information to its page table mechanism, replacing GVAs with corresponding HPAs to ensure accurate address translation for GPU access. As mentioned above, direct translation from guest virtual address of the virtual machine to host physical address of the GPU may be performed in the NIC, allowing for RDMA access to the GPU memory.

In various implementations, NIC 140 serves as a bridge between the VM's address space and the GPU's physical memory. The NIC includes a page translation cache (PTC) 142, firmware 141, and translation mapper and ring 143. The PTC stores frequently accessed address mappings, allowing for rapid translations of GVAs to HPAs without having to repeatedly query the PTT. If a mapping is not found in the PTC, the NIC refers to the PTT to retrieve the necessary HPA. For example, if the required mapping is not found in the PTC 142 (a "PTC miss"), NIC 140 accesses the complete PTT 11 in the host machine to retrieve the HPA, which it then caches in PTC 142. Firmware 141 manages the NIC's low-level operations and controls how data is transferred through the device. For example, ring 143 coordinates the data flow within the NIC, enabling it to send data packets directly to GPU memory based on the HPA provided by the mapping table. For example, ring 143 includes a translation mapper that enables NIC 140 to look up HPAs from the mapping table or PTC, facilitating access to GPU memory. Ring 143 manages the data transfer pathway, allowing NIC 140 to send data directly to the GPU through a PCIe Switch (not shown in FIG. 1) using the HPA, bypassing the system memory and CPU 110.

In operation, when an application within the VM requests GPU memory, the NIC driver 124 translates the GVA to HPA, where host tool 132 provides mapping to HPA. The mapping table is then transferred to NIC 140 via NIC driver 124, allowing NIC 140 to retrieve HPAs using PTC 142. Once the mappings are in place, the NIC can bypass the host CPU and access GPU memory directly, allowing for fast data transfers and reduced latency for GPU-intensive tasks in the virtualized environment.

Figure 2:
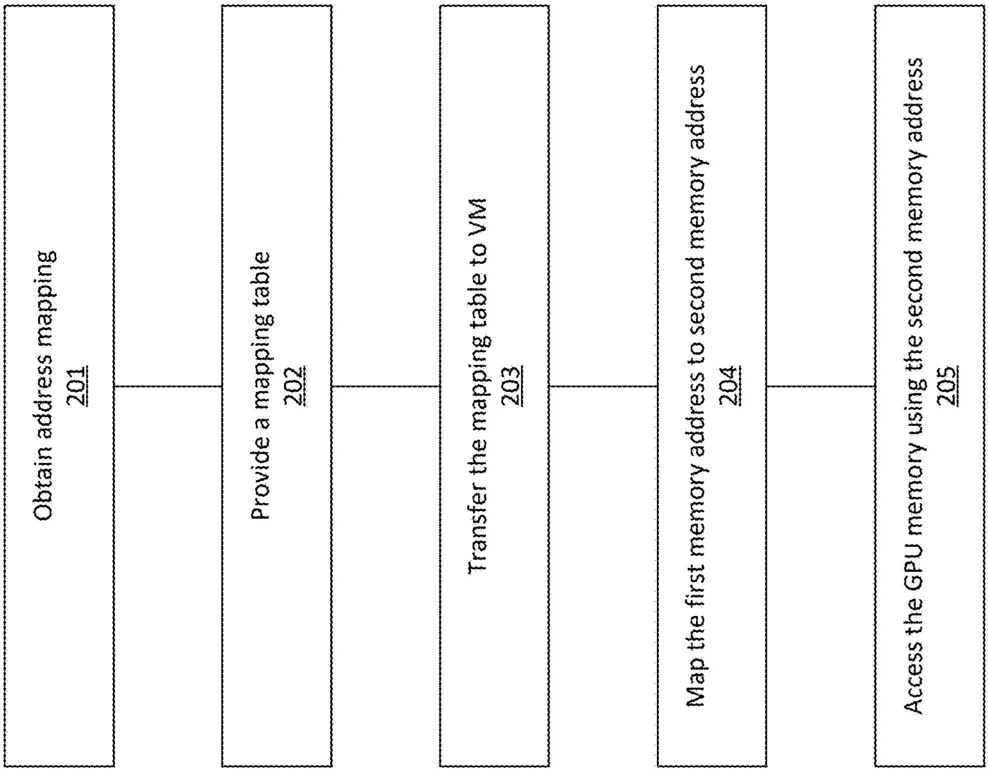
FIG. 2 is a simplified flow diagram illustrating a method for accessing GPU memory according to embodiments of the subject technology.

FIG. 2 is a simplified flow diagram illustrating a method for accessing GPU memory according to embodiments of the subject technology. This diagram is merely an example, which should not unduly limit the scope of the claims. One of ordinary skill in the art would recognize many variations, alternatives, and modifications. For example, one or more steps may be added, removed, repeated, replaced, modified, rearranged, and/or overlapped, and should not limit the scope of the claims.

Obtain Address Mapping, Step 201. At the initial stage, a host tool (e.g., provided at the host machine) is configured to obtain mappings between memory addresses in the virtual machine and the GPU. For example, it involves the host tool utilizing PCI and/or QEMU utilities to extract GVAs and HPAs associated with the GPU memory allocated to the VM. These mappings are needed to bridge the VM's virtualized address space with the physical memory in the GPU, allowing direct access later in the process.

As an example, during this step, the vendor specific tool, extracts the GVA and HPA information of associated GPUs through QEMU utilities or PCI monitoring. This data extraction is used for establishing accurate mappings for the VM's access to GPU memory.

Provide a Mapping Table, Step 202. After extracting the necessary GVA and HPA information, the host tool generates a GVA-to-HPA mapping table. This mapping table acts as a reference for translating addresses from the VM's virtual memory space to the GPU's physical memory space. The mapping table is updated in response to any changes in the VM's or GPU's memory allocation, ensuring the address translation remains accurate and current.

For example, once the mapping information is extracted, the vendor specific tool pushes both GVA and HPA mappings to the firmware through a communication tool, which ensures that the mapping table is consistently synchronized with the GPU memory allocation.

Transfer the Mapping Table to the Virtual Machine (Step 203): The host machine transfers the GVA-to-HPA mapping table to the VM through a conduit or communication link. This allows the VM's NIC Driver to access up-to-date mappings directly. For example, the NIC driver uses the mapping table to interpret memory addresses, enabling the network communication device (e.g., an NIC) within the VM to operate effectively without needing continuous host intervention.

For example, the mapping table is received and processed by the NIC driver within the VM, which extracts the peer memory mapping information from the firmware. The NIC driver can then apply these mappings to facilitate direct access to GPU memory.

Map the First Memory Address to the Second Memory Address, Step 204. At the VM, the NIC driver applies the mapping table to configure NIC device to translate GVAs, as used by applications within the VM, into HPAs The translation process may be managed using an address mapping table, which may include a PTC for caching frequently accessed mappings and a PTT for storing the full range of mappings. When a translation request is received, the NIC driver can access the HPA for a given GVA, enabling rapid data access without engaging the host CPU.

For example, the NIC driver first translates GVAs to HPA using mappings obtained from the host tool. If the NIC encounters a "PTC miss" (i.e., the required mapping is not in the cache), it will retrieve the mapping from the PTT and cache it in the PTC for future access.

Access the GPU Memory Using the Second Memory Address, Step 205. The NIC uses the HPA retrieved from the translation process to access the GPU memory directly. The access bypasses the host CPU and system memory, allowing for an efficient and low-latency data transfer between the VM and GPU. This direct path is useful for applications requiring high-performance GPU resources, such as AI and ML workloads, which benefit from the rapid access to GPU memory.

For example, upon receiving a remote direct memory access (RDMA) packet, the NIC identifies the queue pair (QP) and memory region (MR) associated with the packet to establish the appropriate communication channel with the GPU memory. Using the mapped HPA, the NIC performs a DMA operation to the GPU, ensuring high-speed data transfer without CPU involvement.

Figure 3:
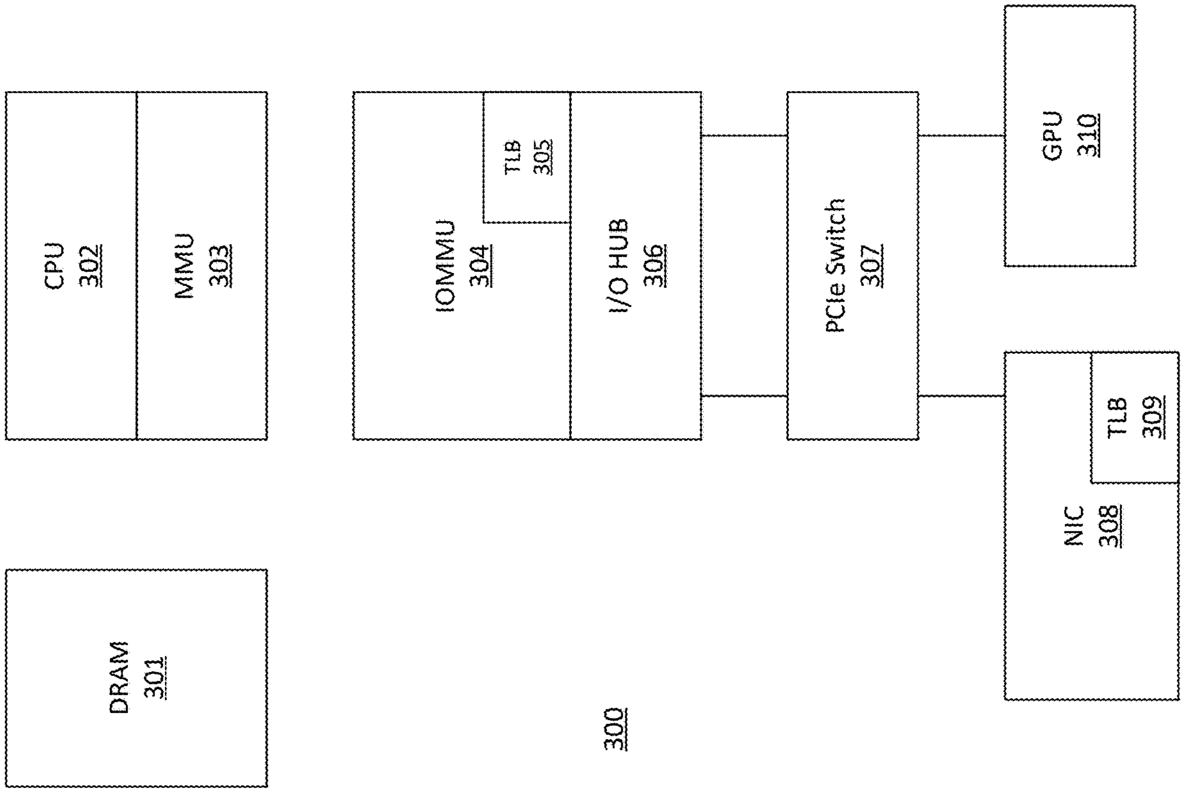
FIG. 3 is a simplified flow diagram illustrating a method for accessing GPU memory without address translation supported by a network interface card according to embodiments of the subject technology.

FIG. 3 is a simplified flow diagram illustrating a method for accessing GPU memory without address translation supported by a network interface card according to embodiments of the subject technology. This diagram is merely an example, which should not unduly limit the scope of the claims. One of ordinary skill in the art would recognize many variations, alternatives, and modifications.

System 300 includes a dynamic random-access memory (DRAM) 301, which serves as the primary memory for the host machine. DRAM 301 provides storage for operating system data, application data, and other resources that the CPU accesses frequently. For exmaple, the DRAM may support memory access requests originating from both the CPU and I/O devices like the NIC and GPU, which require access to memory regions mapped to virtual machines.

System 300 also includes CPU and MMU. CPU 302 is configured for executing instructions and handling general computation tasks for the host. MMU 303 manages virtual-to-physical address translation for the CPU. For example, the MMU enables the CPU to access data in DRAM by translating virtual addresses (used by applications running on the CPU) to physical addresses in memory. In a virtualized setup, the MMU works in conjunction with the IOMMU to coordinate memory access and address translation for virtual machines and I/O devices.

IOMMU 304 facilitates memory address translation for I/O devices, allowing them to access memory independently of the CPU. It performs address translation specifically for devices such as the NIC and GPU, translating guest virtual addresses (GVAs) associated with virtual machines into host physical addresses (HPAs) in DRAM or GPU memory. This component is crucial in virtualized environments, where VMs require direct access to I/O resources. Translation lookaside buffer (TLB) 305 in the IOMMU 304 stores recently used address translations to expedite memory access for I/O devices. By storing frequently accessed translations, the TLB in the IOMMU reduces the need for repeated lookups, thereby improving data transfer speeds and lowering latency in communication between the NIC and GPU.

I/O Hub 306 connects the IOMMU 304 to the PCIe Switch 307, serving as an intermediary that manages data flow between the CPU, IOMMU, and connected devices like the NIC and GPU. For example, the I/O Hub routes data packets and coordinates address translation requests, ensuring that address translation operations conducted by the IOMMU are applied consistently across all I/O devices in the system.

PCIe switch 307 provides high-speed connectivity between the NIC 308 and GPU 310, allowing them to communicate with each other without passing data through the CPU or DRAM. For example, PCIe switch 307 enables peer-to-peer (P2P) transfers, where the NIC can directly access the GPU memory using host physical addresses, thus bypassing the CPU and reducing latency. NIC 308 is responsible for managing data transmission between the network and the host system. In various embodiments, NIC 308 includes functionality to handle address translation and direct memory access (DMA) to the GPU. For example, NIC supports virtualized environments by enabling VMs to access GPU resources without requiring CPU intervention. NIC 308 includes TLB 309 that caches address translations for frequently accessed memory regions in the GPU. The NIC's TLB allows it to translate GVAs to HPAs more efficiently, improving data transfer rates and minimizing latency during repeated memory access operations.

GPU 310 provides accelerated processing capabilities, particularly for applications involving parallel computation, such as AI and machine learning workloads. The GPU is connected to the PCIe Switch, allowing the NIC to access its memory directly through the P2P setup. This direct access enables efficient data transfers between the NIC and GPU, allowing VMs to utilize GPU resources without relying on the CPU.

In system 300, the NIC initiates a memory access request when it receives data intended for processing by the GPU. When NIC 308 needs to access GPU memory, it first checks TLB 309 for the corresponding address translation from GVA to HPA. If the translation is not in the NIC's TLB, it forwards the request to the IOMMU 304, which includes TLB 305 to cache address translations. If the required translation is not available in the NIC's TLB, the IOMMU processes the request and provides the appropriate HPA. This address translation enables the NIC to perform memory operations on the GPU memory without involving the CPU. Once the NIC has obtained the HPA, it uses the PCIe Switch 307 to directly transfer data to and from the GPU 310. This direct path reduces latency by bypassing the CPU and main DRAM.

Figure 4:
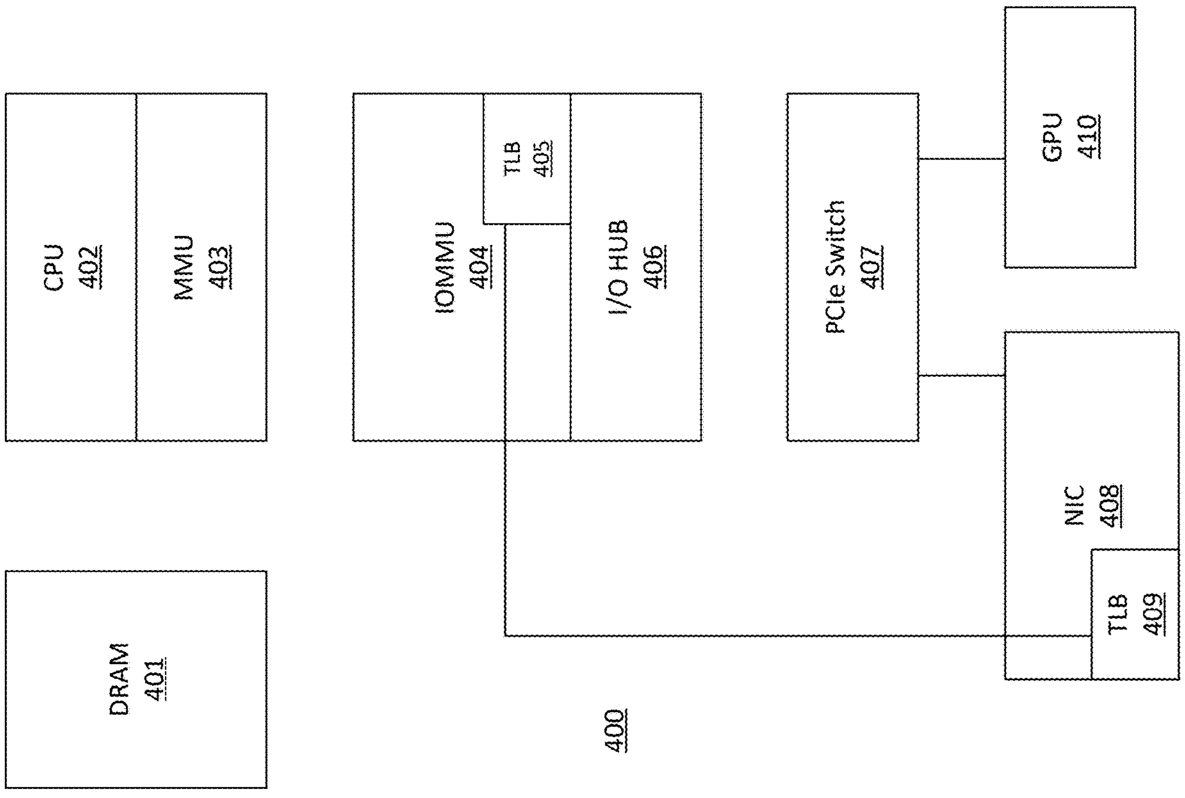
FIG. 4 is a simplified flow diagram illustrating a method for accessing GPU memory with address translation supported by a network interface card according to embodiments of the subject technology.

FIG. 4 is a simplified flow diagram illustrating a method for accessing GPU memory with address translation supported by a network interface card according to embodiments of the subject technology. This diagram is merely an example, which should not unduly limit the scope of the claims. One of ordinary skill in the art would recognize many variations, alternatives, and modifications.

System 400 includes a dynamic random-access memory (DRAM) 401, which serves as the primary memory for the host machine. DRAM 401 provides storage for operating system data, application data, and other resources that the CPU accesses frequently. For exmaple, the DRAM may support memory access requests originating from both the CPU and I/O devices like the NIC and GPU, which require access to memory regions mapped to virtual machines.

System 400 also includes CPU and MMU. CPU 402 is configured for executing instructions and handling general computation tasks for the host. MMU 403 manages virtual-to-physical address translation for the CPU. For example, the MMU enables the CPU to access data in DRAM by translating virtual addresses (used by applications running on the CPU) to physical addresses in memory. In a virtualized setup, the MMU works in conjunction with the IOMMU to coordinate memory access and address translation for virtual machines and I/O devices.

IOMMU 404 provides address translation services specifically for I/O devices, allowing them to access memory independently of the CPU. In a virtualized environment, it translates GVAs from VMs to HPAs in DRAM or GPU memory. TLB 405 within the IOMMU caches frequently accessed translations, optimizing memory access and reducing latency by minimizing repeated lookups for the NIC and GPU. For example, IOMMU is directly connected to NIC 409 for sharing address information.

I/O Hub 406 acts as an intermediary, the I/O Hub connects the IOMMU to the PCIe Switch 407 and manages data flow between the CPU, IOMMU, and other connected devices, such as the NIC and GPU. This hub routes data packets and coordinates address translation requests, ensuring the IOMMU's operations are consistently applied across all I/O devices.

PCIe switch 407 provides high-speed connectivity between the NIC 408 and GPU 410, facilitating peer-to-peer (P2P) transfers. This setup allows the NIC to directly access GPU memory using host physical addresses without involving the CPU, resulting in reduced latency and lower CPU memory bandwidth usage.

NIC 408 is configured for managing network data transmission. In virtualized settings, NIC 408 includes a TLB 409 for caching address translations, enabling efficient access to GPU memory. By leveraging cached translations, the NIC can perform memory operations on the GPU with minimal delay, supporting high-throughput data transfers without requiring CPU intervention. For example, IOMMU is directly connected to NIC 409 for sharing address information. In various implementations, NIC 408 supports pass-through virtualization with address translation services, and NIC 408 is able to access TLB 405 directly to obtain address information as needed.

GPU 410 provides accelerated processing capabilities, particularly for applications involving parallel computation, such as AI and machine learning workloads. The GPU is connected to the PCIe Switch, allowing the NIC to access its memory directly through the P2P setup. This direct access enables efficient data transfers between the NIC and GPU, allowing VMs to utilize GPU resources without relying on the CPU.

In system 400, when the NIC 408 initiates a memory access request for GPU processing, it checks TLB 409 for the required GVA-to-HPA translation. If unavailable, it forwards the request to the IOMMU 404, which may retrieve or store the translation in its TLB 405. This approach allows the NIC to interact directly with GPU memory through the PCIe Switch 407, optimizing data flow by bypassing the CPU and DRAM and reducing transaction overhead in PCI bandwidth.

According to an embodiment, the subject technology provides a system in a virtualized computing environment. The system includes a host machine equipped with a tool that manages address mappings between two types of memory addresses: one associated with a virtual machine and another linked to a GPU. The host tool generates and maintains a mapping table, which serves as a bridge between these two memory addresses. This mapping table is transferred through a communication link to the virtual machine associated with a network communication device. Within the virtual machine, a driver for the network communication device retrieves the mapping table via the communication link, enabling the translation from the first to the second memory address. It is to be appreciated the system allows the virtual machine to access GPU memory directly using the mapped address.

For example, the host tool includes a utility that updates the mapping table in response to changes in memory allocation within the virtual machine or the GPU. The communication link can also disseminate the mapping table to multiple virtual machines, each with its own network communication device. The network device driver is capable of caching frequently accessed address mappings, further enhancing efficiency by reducing repeated translation needs. This mapping table may also include access permissions and security-based control, governing memory region access on the GPU according to specific policies. Furthermore, the host tool can receive notifications from the virtual machine when memory mappings need adjustments due to memory resource reallocation.

The network communication device is configured to support DMA to the GPU memory using the mapped address, bypassing the host machine's CPU to streamline data handling. Here, the virtual machine's memory is treated as guest physical memory, while the GPU memory is host physical memory. The network communication device also includes a page translation cache to improve access speed, while the host machine contains a page translation table for managing address mappings.

According to an embodiment, the subject technology provides a method that involves using the host tool on the host machine to obtain address mappings between a virtual machine memory address and a GPU memory address. It then creates a mapping table for translating between these addresses and transfers this table to the virtual machine over a communication link. The virtual machine, connected to a network communication device, uses the mapped address to access GPU memory, bypassing the CPU and main system memory, thus enhancing performance. Furthermore, the method includes receiving a DMA packet by the network communication device and identifying a QP associated with the DMA packet to determine the communication channel for accessing GPU memory. The method may also determine specific GPU memory regions for DMA operations, update the mapping table based on changes in virtual machine or GPU memory allocation, and restrict access to GPU memory regions following security policies.

According to another embodiment, the subject technology provides a network communication device (e.g., NIC device) that includes a first interface to receive the mapping table from the host machine. For example, the mapping table provides address mappings between the virtual machine and GPU memory. The mapping table is stored in a buffer, and a mapper retrieves the GPU memory address from it in response to memory access requests. Additionally, the network communication device a second interface facilitates GPU memory access using the mapped address, potentially connecting to a network switch in the host machine.

It is to be appreciated that embodiments of the subject technology provide efficient peer-to-peer data transfer in a virtualized environment, allowing an NIC within a virtual machine to directly access GPU memory. Specifically, this approach facilitates direct translation from a GVA to HPA for GPU memory, which serves as a peer device to the NIC. By allowing the NIC driver running inside the VM to retrieve this HPA information for memory regions within the specified GVA range, the NIC can access the necessary memory addresses directly. This setup eliminates the need for additional GPA-to-HPA translations in the NIC when accessing GPU memory allocated to the VM.

Certain systems and methods according to the subject technology allow the NIC to perform DMA to and from GPU memory without needing ATS in the NIC or the connection fabric linking the NIC to the GPU. The feature is beneficial for AI and ML workloads, which are conventionally executed on bare-metal servers or within containers. With this mechanism, virtual machines can leverage GPU resources as a service, allowing AI/ML applications to run effectively within VMs without requiring additional hardware.

Various techniques of the subject technology leverage the direct translation of GVAs to HPAs by the NIC, eliminating the need for GPA-to-HPA synchronization. It removes the latency penalty associated with synchronization processes, which may result in a 5-10% improvement in overall PCIe bandwidth utilization compared to solutions relying on PCIe ATS. It is understood that approaches according to the subject technology are not limited to GPU memory alone, as it can also be used for accessing other memory blocks that use the NIC for direct peer-to-peer memory DMA.

While the above is a full description of the specific embodiments, various modifications, alternative constructions, and equivalents may be used. Therefore, the above description and illustrations should not be taken as limiting the scope of the subject technology which is defined by the appended claims.

What is claimed is:

1. A system comprising:

a host machine configured to operate in a virtualized computing environment, the host machine comprising instructions stored in a memory storing a host tool that is executable by a hardware processor, the host tool being configured to obtain address mappings between a first memory address and second memory address, the first memory address being associated with a virtual machine, the second memory address being associated with a host memory mapped to a graphic processing unit (GPU) memory, the host tool further being configured to provide a mapping table for mapping between the first memory address and a second memory address; and a communication link configured to transfer the mapping table from the host machine to the virtual machine associated with a network communication device, the communication link being configured to receive a direct memory access packet and to identify a queue pair associated with the direct memory access packet to determine a communication channel for accessory the memory of the GPU;

wherein the virtual machine comprises instructions stored in the memory executed by the hardware processor for a driver for the network communication device running on the virtual machine, the driver is configured to obtain the mapping table from the communication link and provide the second memory address from the mapping table to an address mapping table of the network communication device, the first memory address is mapped into the second memory address, the virtual machine is configured to access the memory of the GPU using the first memory address.

2. The system of claim 1, wherein the host tool comprises instructions stored in the memory executed by the hardware processor a utility configured to update the mapping table in response to changes in a memory allocation of the virtual machine.

3. The system of claim 1, wherein the host tool comprises instructions stored in the memory executed by the hardware processor a utility configured to update the mapping table in response to changes in a memory allocation of the GPU.

4. The system of claim 1, wherein the communication link is configured to transfer the mapping table from the host machine to a plurality of virtual machines, each virtual machine of the plurality of virtual machines being associated with a different network communication device.

5. The system of claim 1, wherein the driver is configured to cache frequently accessed mappings between the first memory address and the second memory address.

6. The system of claim 1, wherein the mapping table comprises permissions and access control information associated with access to regions of the memory of the GPU based on security policies.

7. The system of claim 1, wherein the host tool is configured to receive notifications from the virtual machine for modification of memory mapping needs due to reallocation of memory resources.

8. The system of claim 1, wherein the network communication device is configured to perform direct memory access to the memory of the GPU using the second memory address and bypassing a processing unit of the host machine.

9. The system of claim 1, wherein the first memory address comprises a guest virtual memory.

10. The system of claim 1, wherein the second memory address comprises a host physical memory.

11. The system of claim 1, wherein the network communication device comprises a page translation cache.

12. The system of claim 1, wherein the host machine comprises a page translation table.

13. A method comprising:

executing instructions stored in a memory by a processor, the instructions comprising:

obtaining address mappings between a first memory address associated with a virtual machine and a second memory address associated with a memory of a graphics processing unit (GPU) using a host tool on a host machine;

providing a mapping table for mapping the first memory address with the second memory address, the first memory address being associated with the virtual machine, the second memory address being associated with the memory of the GPU;

transferring the mapping table from the host machine to the virtual machine via a communication link, the virtual machine being connected to a network communication device;

mapping the first memory address into the second memory address using the mapping table;

receiving a direct memory access packet by the network communication device; and identifying a queue pair (QP) associated with the direct memory access packet to determine a communication channel for accessing the memory of the GPU; and accessing the memory of the GPU by the virtual machine using the second memory address obtained from an address translation table, bypassing a central processing unit (CPU) and system memory of the host machine.

14. The method of claim 13, further comprising determining a memory region of the memory of the GPU for the direct memory access packet.

15. The method of claim 13, further comprising updating the mapping table based on changes in memory allocation of the virtual machine.

16. The method of claim 13, further comprising updating the mapping table based on changes in memory allocation of the GPU.

17. The method of claim 13, further comprising limiting access to regions of the memory of the GPU based on security policies.

18. A network communication device comprising:

a first interface configured to, using instructions stored in a memory executed by a hardware processor, receive a mapping table from a host machine, the host machine being configured to operate in a virtualized environment, the mapping table comprising address mappings between a first memory address and a second memory address, the first memory address being associated with a virtual machine, the second memory address being associated with a memory of a graphics processing unit (GPU), the mapping table being configured for mapping the first memory address to the second memory address;

a buffer configured to store the received mapping table;

a mapper, implementing using instructions stored in the memory executed by the hardware processor, configured to obtain the second memory address from the mapping table in response to a request for accessing the memory of the GPU; and a second interface being configured to access the memory of the GPU using the second memory address provided by the mapper;

wherein the communication device is configured to:

receive a direct memory access packet by the network communication device; and identify a queue pair (QP) associated with the direct memory access packet to determine a communication channel for accessing the memory of the GPU.

19. The network communication device of claim 18, wherein the second interface is connected to a network switch of the host machine.

* * * * *